US012713448B2

(12) United States Patent
Xu et al.

(10) Patent No.: US 12,713,448 B2
(45) Date of Patent: Aug. 18, 2026

(54) INFORMATION NOTIFICATION METHOD, COMMUNICATION NODE, AND STORAGE MEDIUM

(71) Applicant: ZTE CORPORATION, Shenzhen (CN)

(72) Inventors: Hui Xu, Shenzhen (CN); Jianfeng Ding, Shenzhen (CN); Zhongwei Ji, Shenzhen (CN); Xiaoquan Hua, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 400 days.

(21) Appl. No.: 18/261,134

(22) PCT Filed: Jan. 26, 2022

(86) PCT No.: PCT/CN2022/073927

§ 371 (c)(1),
(2) Date: Jul. 12, 2023

(87) PCT Pub. No.: WO2022/206154

PCT Pub. Date: Oct. 6, 2022

(65) Prior Publication Data

US 2024/0089996 A1 Mar. 14, 2024

(30) Foreign Application Priority Data

Apr. 2, 2021 (CN) ......................... 202110361926.3

(51) Int. Cl.
*H04W 72/044* (2023.01)
*H04L 65/611* (2022.01)
(Continued)

(52) U.S. Cl.
CPC ......... *H04W 72/30* (2023.01); *H04W 72/044* (2013.01); *H04W 72/20* (2023.01)

(58) Field of Classification Search
None
See application file for complete search history.

(56) References Cited

U.S. PATENT DOCUMENTS 11,997,641 B2 * 5/2024 Yu ......................... H04L 12/189
2011/0194428 A1 8/2011 Wang et al.
(Continued)

FOREIGN PATENT DOCUMENTS

CN 101990160 A 3/2011
CN 103945538 A 7/2014

OTHER PUBLICATIONS

Moderator (CMCC): "Summary#2 on mechanisms to support group scheduling for RRC_Connected UEs for NR MBS", 3GPP Draft; R1-2009504, 3rd Generation Partnership Project (3GPP), vol. RAN WG1, No. e-Meeting; Oct. 26, 2020-Nov. 13, 2020, Nov. 5, 2020, XP051952050, URL:https://ftp.3gpp.org/tsg_ran/WG1_RL1/T SGR1_103-e/Docs/R1-2009504.zip R1-2009504.docx.
(Continued)

*Primary Examiner* — Sai Aung
(74) *Attorney, Agent, or Firm* — Morgan, Lewis & Bockius LLP

(57) ABSTRACT

Provided are an information notification method, a communication node, and a storage medium. The information notification method includes determining the position of a resource, where the resource is configured to send notification information, the resource includes at least a time domain resource and a frequency domain resource, the frequency domain resource being located in a downlink bandwidth part (BWP), the notification information is configured to indicate that multicast control channel (MCCH) information is updated, the notification information is configured by using downlink control information (DCI) of a physical downlink control channel (PDCCH), and the PDCCH is sent in a common search space in the downlink
(Continued)

BWP; and sending position information of the resource to a second communication node, and sending the notification information on the resource.

16 Claims, 11 Drawing Sheets

(51) Int. Cl.
*H04W 72/20* (2023.01)
*H04W 72/23* (2023.01)
*H04W 72/30* (2023.01)

(56) References Cited

U.S. PATENT DOCUMENTS

2012/0213143 A1* 8/2012 Zhang .................... H04L 5/001 370/312
2014/0098745 A1* 4/2014 Balasubramanian ... H04W 4/06 370/328
2015/0264666 A1* 9/2015 Yi ........................ H04W 76/27 370/329
2016/0302174 A1* 10/2016 Chatterjee ............ H04L 5/0053
2016/0323061 A1* 11/2016 Lee ...................... H04L 1/0041
2017/0019771 A1* 1/2017 Maheshwari .......... H04L 69/22
2017/0164407 A1* 6/2017 Yang ...................... H04W 4/06
2018/0049006 A1* 2/2018 Hong ..................... H04L 67/60
2019/0174460 A1* 6/2019 Zhang .................... H04L 5/001
2019/0182632 A1* 6/2019 Fujishiro .............. H04W 48/16
2020/0244421 A1* 7/2020 Lee .................... H04L 25/0224
2021/0282115 A1* 9/2021 Sengupta ............. H04L 5/0053

OTHER PUBLICATIONS

Moderator (CMCC): "Summary#7 on mechanisms to support group scheduling for RRC_Connected UEs for NR MBS", 3GPP Draft; R1-2101974, 3rd Generation Partnership Project (3GPP), vol. RAN WG1, No. e-Meeting; Jan. 25, 2021-Feb. 5, 2021, Feb. 2, 2021, XP051976039, URL:https://ftp.3gpp.org/tsg_ran/WG1_RL1/T SGR1_104-e/Docs/R1-2101974.zip R1-2101974.docx.
Extended European Search Report in Application No. 22778342.0, dated Dec. 3, 2024, 8 pages.
International Search Report in Application No. PCT/CN2022/073927, dated Mar. 16, 2022, 4 pages, including translation.

* cited by examiner

INFORMATION NOTIFICATION METHOD, COMMUNICATION NODE, AND STORAGE MEDIUM

CROSS REFERENCE TO RELATED APPLICATIONS

This is a National Stage Application, filed under 35 U.S.C. 371, based on International Patent Application No. PCT/CN2022/073927, filed on Jan. 26, 2022, which claims priority to Chinese Patent Application No. 202110361926.3, filed with the China National Intellectual Property Administration (CNIPA) on Apr. 2, 2021, the disclosures of which are incorporated herein by reference in their entireties.

TECHNICAL FIELD

The present application relates to the field of wireless communication networks, for example, an information notification method, a communication node, and a storage medium.

BACKGROUND

With the continuous development of wireless communication networks, wireless communication has played an increasingly important role in people's lives. In a multicast broadcast service (MBS) service which the Rel-17 of the 5th generation (5G) mobile communication technology of the 3rd Generation Partnership Project (3GPP) has started to study, a radio access network (RAN) is required to support the update notification of a multicast control channel (MCCH). That is, a base station needs to notify a user equipment (UE) interested in the MBS service when the MCCH content is updated (such as a new MBS service session starts). However, since the New Radio (NR)-MBS service uses a system architecture based on 5G, there is no implementation scheme of MCCH update notification for the NR-MBS service.

SUMMARY

The present application provides an information notification method, a communication node, and a storage medium, which can effectively reduce power consumption of a UE and improve system performance when implementing the MCCH update notification of an NR-MBS service.

An embodiment of the present application provides an information notification method applied to a first communication node. The method includes determining the position of a resource, where the resource is configured to send notification information, the resource includes at least a time domain resource and a frequency domain resource, the frequency domain resource is located in a downlink bandwidth part (BWP), the notification information is configured to indicate that multicast control channel (MCCH) information is updated, the notification information is indicated by using downlink control information (DCI) of a physical downlink control channel (PDCCH), and the PDCCH is sent in a common search space in the downlink BWP; and sending position information of the resource to a second communication node, and sending the notification information on the resource.

An embodiment of the present application provides an information notification method applied to a second communication node. The method includes receiving position information of a resource sent by a first communication node, where the resource is configured to send notification information, the resource includes at least a time domain resource and a frequency domain resource, the frequency domain resource is located in a downlink bandwidth part (BWP), the notification information is configured to indicate that multicast control channel (MCCH) information is updated, the notification information is indicated by using downlink control information (DCI) of a physical downlink control channel (PDCCH), and the PDCCH is sent in a common search space in the downlink BWP.

An embodiment of the present application provides a communication node. The communication node includes a processor. The processor is configured to, when executing a computer program, implement the information notification method in the preceding embodiments.

An embodiment of the present application also provides a computer-readable storage medium storing a computer program which, when executed by a processor, implements the information notification method in the preceding embodiments.

DETAILED DESCRIPTION

Embodiments of the present application are described below in conjunction with drawings.

With the rapid development of wireless communication networks and the popularization of large-screen multi-function mobile terminals, the demand for a large number of mobile data multimedia services and various high-bandwidth multimedia services, such as video conferencing, television broadcast, video on demand, advertisement, online education, and interactive games, is rapidly rising. This not only meets the multi-service demand of mobile users, but also brings new service growth points for mobile operators. These mobile data multimedia services require multiple users to receive the same data at the same time. Compared with general data services, these mobile data multimedia services have the characteristics of large amount of data, a long duration, and being sensitive to delay.

Figure 1:
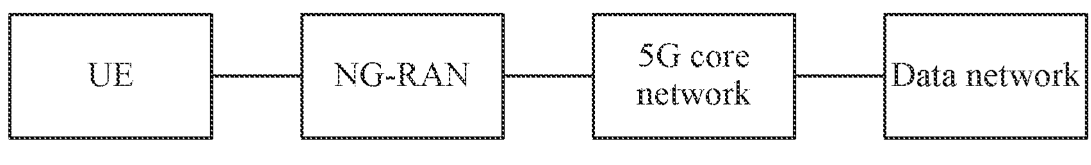
FIG. 1 is an advanced system architecture supporting an MBS service.

To effectively utilize mobile network resources, an MBS service is proposed in 3GPP 5G Rel-17. The MBS service is a technology for transmitting data from one data source to multiple target mobile terminals, implementing sharing of network (including a core network and an access network) resources and improving a utilization rate of network resources (especially air interface resources). The MBS service defined by 3GPP can not only implement the multicast and broadcast of messages of plain text and low rate, but also can implement broadcast and multicast of high-speed multimedia services, providing a variety of rich video, audio, and multimedia services. This undoubtedly complies with the trend of future mobile data development and provides a better service prospect for the development of 5G. FIG. 1 is an advanced system architecture supporting an MBS service. As shown in FIG. 1, the system architecture includes a UE, a next generation-RAN (NG-RAN), a 5G core network 5GC), and a data network.

In a long term evolution (LTE) system, the UE is notified of the session start of a multimedia broadcast and multicast service (MBMS) service or that a counting request is initiated by a network-side device. Downlink control information (DCI) and an MBMS-radio network temporary identifier (M-RNTI) can be sent on a physical downlink control channel (PDCCH) first. The UE reads an MCCH message according to the related information in the DCI. This is referred to as an MCCH change notification mechanism. Service configuration parameters, such as service identity (ID) and radio link control (RLC), media access control (MAC), and physical layer configuration parameters of the service, are sent on an MCCH.

The MBS service has the characteristics of a large amount of data of the service, a long duration of the reception of a mobile terminal, and a constant average data rate. The preceding characteristics determine that the scheduling and control signaling configuration of the MBS service are semi-static. That is, the scheduling information and control signaling information of the MBS service remain unchanged for a long time. The scheduling information and control signaling information are sent periodically through the MCCH and are collectively referred to as MCCH information. An MBS notification message is used for describing whether the MCCH information changes. For a UE in a radio resource control idle (RRC Idle) mode, a radio resource control inactive (RRC Inactive) mode, or a radio resource control connected (RRC Connected) mode, it is only necessary to listen to the MBS notification message to know whether the MCCH information changes. Thus, the MCCH information is selectively received, that is, new MCCH information is received only when the MCCH information changes. Since the information volume of the MBS notification message is far less than that of the MCCH information, the UE selectively receives the MCCH information. This can effectively save resources and reduce power consumption.

Figure 2:
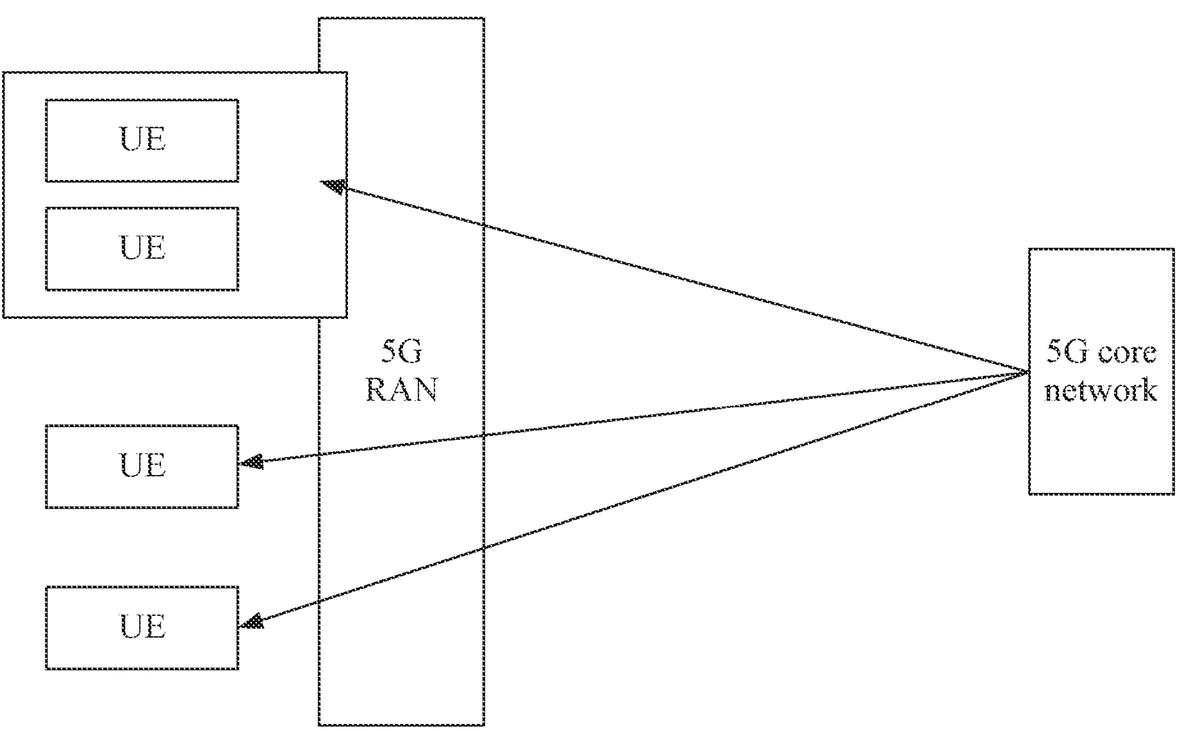
FIG. 2 is a diagram of a 5G MBS service transmission mode.

FIG. 2 is a diagram of a 5G MBS service transmission mode. As shown in FIG. 2, the 5G MBS service transmission mode includes two types from the perspective of a 5G core network: a 5GC separate MBS service transmission mode and a 5GC shared MBS service transmission mode. From the perspective of a 5G RAN, the air interface mode of the 5GC shared MBS service transmission mode can be divided into two types: a point-to-point transmission mode and a point-to-multipoint transmission mode. Using the MBS technology to send broadcast data to a service area, Internet Protocol television (IPTV), software distribution, group communication, Internet of things (IoT) application, vehicle-to-everything (V2X) application, and the like can be implemented.

However, in the 5G MBS service, with a new system architecture and a wireless resource allocation mode, an update notification scheme for the MBMS MCCH in the LTE system cannot be used, and a reselection design is required. For example, there is no multimedia broadcast single frequency network (MBSFN) transmission mode or MBSFN subframe design in the 5G MBS service. 5G time domain resource granularity is a slot/symbol. LTE time domain resource granularity is a subframe. 5G frequency domain resources are based on a bandwidth part (BWP). LTE has no concept of BWP.

To solve the preceding problems, an embodiment of the present application provides a mobile communication network (including but not limited to 5G). The network architecture of the mobile communication network may include a terminal device and an access network device. The terminal device is connected to the access network device in a wireless manner. The position of the terminal device may be fixed or movable. In embodiments of the present application, an information notification method, a communication node, and a storage medium for operable on the preceding network architecture are provided, which can effectively reduce power consumption of a UE and improve system performance when implementing the MCCH update notification of an NR-MBS service.

The access network device is an access device that is accessed to a mobile communication system by the terminal device in a wireless manner. The access network device may be a base station, an Evolved Node B (eNodeB), a transmission reception point (TRP), a next generation Node B (gNB) in a 5G mobile communication system, a base station in a future mobile communication system, or an access node in a WiFi system. The access network device may also be a module or unit that performs part of the functions of a base station, for example, a central unit (CU) or a distributed unit (DU). The embodiments of the present application do not limit the technology and device form used by the access network device. In the present application, the access network device may be referred to as a network device for short. The network device refers to the access network device without otherwise specified.

The terminal device may also be referred to as a terminal, a user equipment (UE), a mobile station, a mobile terminal, or the like. The terminal device may be a mobile phone, a tablet computer, a computer having wireless transceiving functions, a virtual reality terminal device, an augmented reality (AR) terminal device, a wireless terminal in industrial control, a wireless terminal in self-driving, a wireless terminal in remote surgery, a wireless terminal in a smart grid, a wireless terminal in transportation safety, a wireless terminal in a smart city, and a wireless terminal in smart home. The embodiments of the present application do not limit the technology and device form used by the terminal device.

Hereinafter, the information notification method, the communication node, and technical effects thereof are described.

Figure 3:
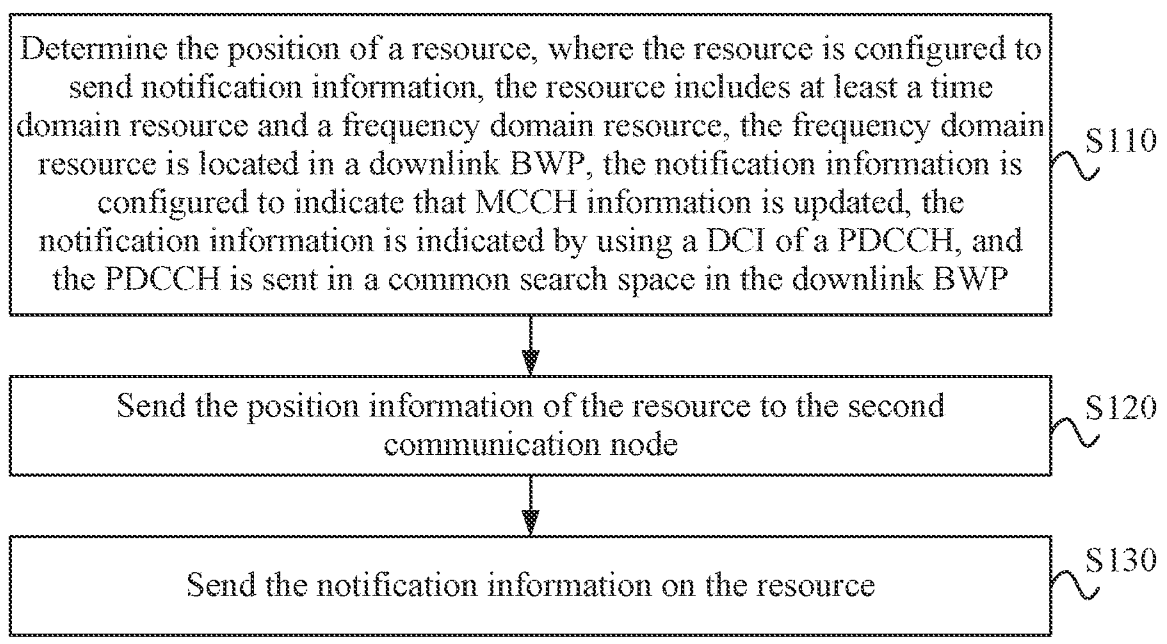
FIG. 3 is a flowchart of an information notification method according to an embodiment.

FIG. 3 is a flowchart of an information notification method according to an embodiment. As shown in FIG. 3, the method provided in this embodiment is applicable to a first communication node (such as a base station). The method includes the following steps.

In S110, the position of a resource is determined. The resource is configured to send notification information. The resource includes at least a time domain resource and a frequency domain resource. The frequency domain resource is located in a downlink BWP. The notification information is configured to indicate that MCCH information is updated, and notification information is configured to indicated by using DCI of a PDCCH. The PDCCH is sent in a common search space in the downlink BWP.

The position of the resource determined (or configured) by the first communication node may be configured in a semi-static manner, that is, configured by radio resource control (RRC) signaling (for example, a system information block (SIB)).

In an embodiment, the frequency domain resource is located in the downlink BWP, including any one of the following.

(1) The frequency domain resource is located in an initial downlink BWP.

The frequency domain resource being located in the initial downlink BWP includes any one of the following two cases.

Case 1: The initial downlink BWP is equal to bandwidth of a control resource set (CORESET) #0.

When a second communication node is initially accessed, a synchronization signal block (SSB) and a physical broadcast channel (PBCH) are scanned first. Parameters of the CORESET #0 are determined according to the acquired SSB/PBCH. Basic configuration parameters of the initial downlink BWP are set to be the same as the parameters of the CORESET #0. The basic configuration parameters of the initial downlink BWP include bandwidth (for example, the number of physical resource blocks (PRBs)), the position of frequency domain, and a parameter set (including a subcarrier spacing and a cyclic prefix (CP)).

The initial downlink BWP is a continuous frequency domain resource.

Case 2: The initial downlink BWP is configured by radio resource control (RRC) signaling.

The second communication node first determines the size and position of the CORESET #0 according to the acquired SSB/PBCH. Then, the corresponding remaining minimum system information (RMSI) (such as SIB1, SIB2, . . . , etc.) content is acquired according to the CORESET #0. Finally, the basic configuration parameters of the initial downlink BWP, such as the offset of the initial downlink BWP relative to a common resource block (CRB) and the SSB and the resource indicator value (RIV) of the initial downlink BWP, are indicated in the SIB or other available RRC signaling. The RIV indicates the starting point and length of the BWP.

(2) The frequency domain resource is located in a specific downlink BWP of the second communication node.

The second communication node first accesses a cell and then establishes an RRC connection with the first communication node. The second communication node obtains the specific downlink BWP indication information of the second communication node according to the indication of the RRC signaling of the first communication node.

The specific downlink BWP is a continuous frequency domain resource PRB.

(3) The frequency domain resource is located in a default downlink BWP.

If the first communication node is configured with the default downlink BWP, the frequency domain resource of the notification information is located in the configured default downlink BWP. If the first communication node does not configure the default downlink BWP, the initial downlink BWP is used as the default downlink BWP. The first communication node sets a fallback timer timer-1. The timer timer-1 is started when a downlink BWP is activated. The downlink BWP falls back to the default downlink BWP when the timer-1 times out. The first communication node configures the frequency domain resource of the notification information in the default downlink BWP.

The default downlink BWP is a continuous frequency domain resource PRB.

In an embodiment, the position information of the frequency domain resource is indicated by using a bitmap in RRC signaling. The bitmap indicates the PRB occupied by the notification information in the downlink BWP.

That is, the PRB occupied by the CORESET in the downlink BWP is indicated by using the RRC signaling in the frequency domain resource range. Each bit indicates one RB group containing six resource blocks (RBs). The bitmap may be used to arbitrarily select which RB groups in the downlink BWP to occupy.

In an embodiment, the time domain resource includes a slot period, a slot offset, a slot number, a symbol offset, and a symbol number. The symbol offset is indicated by using a bitmap.

The position information of the time domain resource is indicated by using RRC signaling. Considering the second communication node in RRC-Idle and RRC-inactive modes, the RRC signaling generally uses a system broadcast message (for example, RMSI) or a paging message. The time domain resource includes a slot period, a slot offset, and a symbol offset. The time domain resource also includes the number of continuous slots in each slot period and the number of continuous symbols in one slot.

In an embodiment, the resource also includes a beam resource (for example, a transmission configuration indication (TCI) state). The beam resource is formed by using an analog beam. The position of the resource also includes the position of the beam resource.

The position information of the beam resource is indicated by using the TCI state and the quasi co-location (QCL) information in the RRC signaling. If the RRC signaling includes at least two TCI states, the position information of the beam resource is indicated by using one of the TCI states activated by a media access control control element (MAC CE). The reference signal corresponding to the QCL information is used for receiving the PDCCH in which the notification information is located.

In S120, the position information of the resource is sent to the second communication node.

In an embodiment, the position information of the resource is indicated by using RRC signaling.

In S130, the notification information is sent on the resource.

Considering that the update of the notification information for the MCCH content is related to an MCCH modification period, that is, the MCCH modification period may be used for indicating the notification information period. To improve the transmission reliability of the notification information, the notification information may be transmitted multiple times in one MCCH modification period, for example, four times in one MCCH modification period. That is, the notification information is transmitted four times in one MCCH modification period. The slot period of the notification information=the MCCH modification period/4.

In an embodiment, the second communication node interested in receiving the MBS service reads the MCCH information at least once in each modification period.

In an embodiment, the notification information and the updated MCCH information indicated by the notification information are located in the same modification period. The cyclic redundancy check (CRC) of the PDCCH is scrambled by using a radio network temporary identity (RNTI) dedicated to the notification information.

In an embodiment, the first communication node sets the content of the notification information and sends the notification information on the corresponding resource. For example, the first communication node indicates the updated MCCH in the DCI of the PDCCH by using a bitmap, such as setting the corresponding bit to "1".

The first communication node receives session update indication information of a core network device, such as MBS session start information. Assuming that a cell has eight MCCHs, one MBS session starts in MCCH3, and one MBS session starts in MCCH6, the first communication node sets the notification information as 00100100. That is, the content of the DCI in the PDCCH is 00100100. The first communication node can obtain the corresponding relationship between the MCCH and the MBS service according to the indication of other network elements or self-configuration. If one cell has only one MCCH and an update occurs, the notification information is 10000000, 00000001, or 11111111 (assuming that the DCI has 8 information bits). The most significant bit (MSB), the least significant bit (LSB), or all significant bits of the DCI are set to 1. Considering that there is only one MCCH, as long as the second communication node detects the corresponding PDCCH, it is indicated that the MCCH is updated. At this time, the value of the DCI bit may not be set, or the value of the bit in the DCI may be arbitrarily set. In this case, the second communication node does not need to detect the value of the DCI. The DCI is sent on the resource determined in step S110. The CRC of the PDCCH is scrambled by using the RNTI dedicated to the notification information. One or more dedicated RNTIs are provided. For example, there is only one MCCH or there are multiple MCCHs but all the MCCHs use the same RNTI, the number of dedicated RNTIs is one. As in the preceding examples, two MCCHs are updated, and the dedicated RNTI corresponds to all MCCHs (1 to 8). If there are multiple MCCHs and each MCCH corresponds to a different RNTI, there are multiple dedicated RNTIs. As in the preceding examples, the RNTI corresponding to MCCH3 is RNTI-3,and the RNTI corresponding to MCCH6 is RNTI-6. The value of the RNTI may be set in advance. That is, the first communication node and the second communication node are ensured to know the value of the RNTI corresponding to the notification information in advance.

Scrambling refers to an operation in which modulo 2 sum operation is performed on the RNTI and the CRC. The operation result is used as the CRC value of the PDCCH finally sent.

The first communication node may send the notification information by using analog beamforming. That is, all PRBs in a frequency band send the notification information by using the same analog beam. For the notification information sent by using the beamforming, the first communication node may indicate the beam used by the second communication node. This can be implemented by using the transmission TCI state and the QCL information. For example, the first communication node configures one or more TCI states through the RRC signaling. If there is only one TCI, the TCI is used for indicating reception of the PDCCH. If there are multiple TCIs, the first communication node activates the state of one of the TCIs through MAC CE signaling to indicate reception of the PDCCH. For high frequency bands, such as FR2 (Frequency Range 2, 24.25 GHz to 52.6 GHz), the second communication node may use beamforming. That is, the beam receiving the notification information may also be indicated by using the TCI state.

Figure 4:
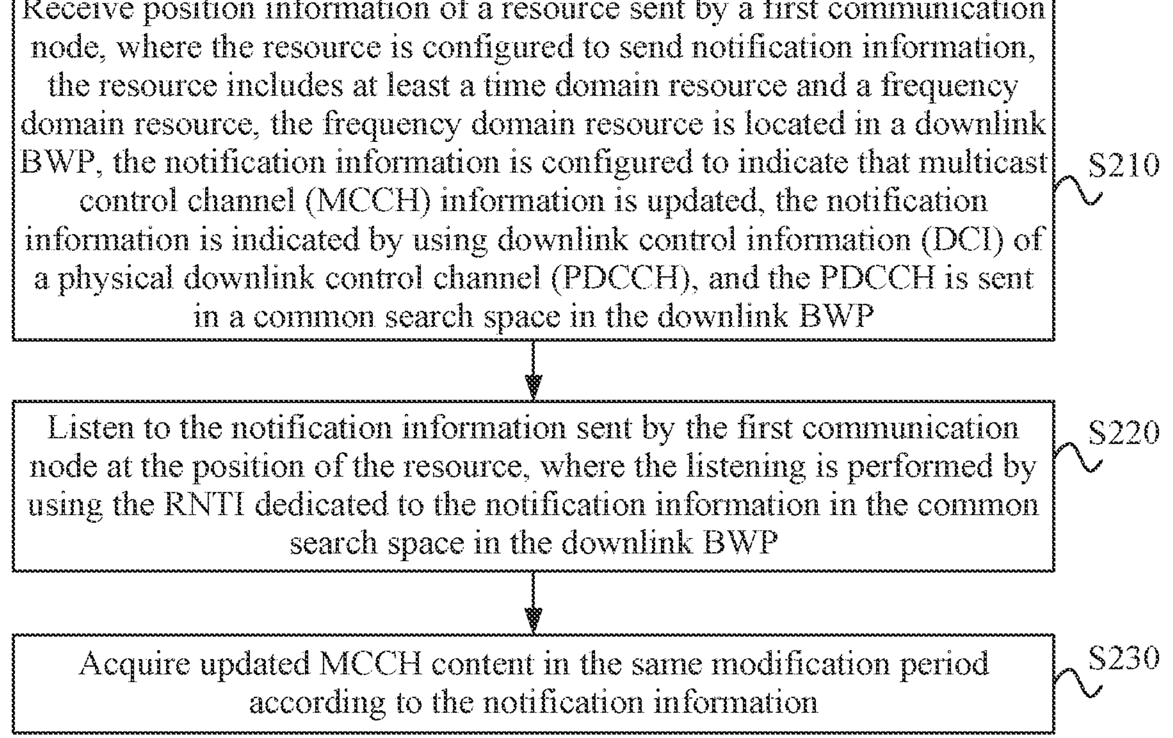
FIG. 4 is a flowchart of another information notification method according to an embodiment.

FIG. 4 is a flowchart of another information notification method according to an embodiment. As shown in FIG. 4, the method provided in this embodiment is applicable to a second communication node (such as a UE). The method includes the following steps.

In S210, position information of a resource sent by a first communication node is received. The resource is configured to send notification information. The resource includes at least a time domain resource and a frequency domain resource. The frequency domain resource is located in a downlink BWP. The notification information is configured to indicate that multicast control channel (MCCH) information is updated, and notification information is configured to indicate by using downlink control information (DCI) of a physical downlink control channel (PDCCH). The PDCCH is sent in a common search space in the downlink BWP.

In an embodiment, the frequency domain resource is located in the downlink BWP, including any one of the following.

(1) The frequency domain resource is located in an initial downlink BWP.

The frequency domain resource being located in the initial downlink BWP includes any one of the following two cases.

Case 1: The initial downlink BWP is equal to the bandwidth of a control resource set CORESET #0.

When the second communication node is initially accessed, a synchronization signal block (SSB) and a physical broadcast channel (PBCH) are scanned first. Parameters of the CORESET #0 are determined according to the acquired SSB/PBCH. Basic configuration parameters of the initial downlink BWP are set to be the same as the parameters of the CORESET #0. The basic configuration parameters of the initial downlink BWP include bandwidth (for example, the number of physical resource blocks (PRBs)), the position of frequency domain, and a parameter set (including a subcarrier spacing and a cyclic prefix (CP)).

The initial downlink BWP is a continuous frequency domain resource.

Case 2: The initial downlink BWP is configured by radio resource control (RRC) signaling.

The second communication node first determines the size and position of the CORESET #0 according to the acquired SSB/PBCH. Then, the corresponding remaining minimum system information (RMSI) (such as SIB1, SIB2, . . . , etc.) content is acquired according to the CORESET #0. Finally, the basic configuration parameters of the initial downlink BWP, such as the offset of the initial downlink BWP relative to a common resource block (CRB) and the SSB and the resource indicator value (RIV) of the initial downlink BWP, are indicated in the SIB or other available RRC signaling. The RIV indicates the starting point and length of the BWP.

(2) The frequency domain resource is located in a specific downlink BWP of the second communication node.

The second communication node first accesses a cell and then establishes an RRC connection with the first communication node. The second communication node obtains the specific downlink BWP indication information of the second communication node according to the indication of the RRC signaling of the first communication node.

The specific downlink BWP is a continuous frequency domain resource PRB.

(3) The frequency domain resource is located in a default downlink BWP.

If the first communication node is configured with the default downlink BWP, the frequency domain resource of the notification information is located in the configured default downlink BWP. If the first communication node does not configure the default downlink BWP, the initial downlink BWP is used as the default downlink BWP. The first communication node sets a fallback timer timer-1. The timer timer-1 is started when a downlink BWP is activated. The downlink BWP falls back to the default downlink BWP when the timer-1 times out. The first communication node configures the frequency domain resource of the notification information in the default downlink BWP.

The default downlink BWP is a continuous frequency domain resource PRB.

In an embodiment, the position information of the frequency domain resource is indicated by using a bitmap in RRC signaling. The bitmap indicates the PRB occupied by the notification information in the downlink BWP.

That is, the PRB occupied by the CORESET in the downlink BWP is indicated by using the RRC signaling in the frequency domain resource range. Each bit indicates one RB group containing six resource blocks (RBs). The bitmap may be used to arbitrarily select which RB groups in the downlink BWP to occupy.

In an embodiment, the time domain resource includes a slot period, a slot offset, a slot number, a symbol offset, and a symbol number. The symbol offset is indicated by using a bitmap.

The position information of the time domain resource is indicated by using RRC signaling. Considering the second communication node in RRC-Idle and RRC-inactive modes, the RRC signaling generally uses a system broadcast message (for example, RMSI) or a paging message. The time domain resource includes a slot period, a slot offset, and a symbol offset. The time domain resource also includes the number of continuous slots in each slot period and the number of continuous symbols in one slot.

In an embodiment, the resource also includes a beam resource (for example, a transmission configuration indication (TCI) state). The beam resource is formed by using an analog beam. The position of the resource also includes the position of the beam resource.

The position information of the beam resource is indicated by using the TCI state and the quasi co-location (QCL) information in the RRC signaling. If the RRC signaling includes at least two TCI states, the position information of the beam resource is indicated by using one of the TCI states activated by a media access control control element (MAC CE). The reference signal corresponding to the QCL information is used for receiving the PDCCH in which the notification information is located.

In an embodiment, the position information of the resource is indicated by using RRC signaling.

In S220, the notification information sent by the first communication node is listened to at the position of the resource. The listening is performed by using the RNTI dedicated to the notification information in the common search space in the downlink BWP.

In an embodiment, the second communication node interested in receiving the multicast broadcast service (MBS) service reads the MCCH information at least once in each modification period.

In an embodiment, the second communication node blindly detects the PDCCH at the position of the acquired resource. That is, detection is performed according to the PDCCH aggregation level (for example, the number of control channel elements (CCEs)) in a search space.

When the second communication node does not find the notification information that the second communication node is interested in, the listening step is repeatedly executed. For the detected PDCCH, the second communication node uses the RNTI dedicated to the notification information and the CRC scrambling operation of the PDCCH, that is, the modulo 2 sum operation. If the result matches, that is, the RNTI scrambled in the CRC is the RNTI corresponding to the notification information, it is indicated that the detected PDCCH is the PDCCH required by the second communication node. The second communication node reads the DCI content in the PDCCH. Otherwise, the result does not match, and the second communication node discards the PDCCH and continues listening to the notification information.

In S230, updated MCCH content is acquired in the same modification period according to the notification information.

The second communication node determines the updated MCCH according to the acquired PDCCH content. If the second communication node is interested in the MCCH in which the MBS service is located, the second communication node reads the corresponding MCCH content, and the corresponding MCCH refers to the MCCH in the same MCCH modification period. That is, the notification information and the updated MCCH are located in the same modification period. The second communication node determines whether the interested MBS service is updated according to the read MCCH content. If the temporary mobile group identifier (TMGI) of the required MBS service appears or is deleted in the MCCH, it is indicated that the MBS service is updated. The second communication node may acquire the MBS service data as required.

According to this embodiment of the present application, the information notification method is provided. The method includes determining the position of the resource, where the resource is configured to send notification information, the resource includes at least the time domain resource and the frequency domain resource, the frequency domain resource is located in the downlink BWP, the notification information is configured to indicate that the multicast control channel (MCCH) information is updated, the notification information is configured to indicate by using the downlink control information (DCI) of the physical downlink control channel (PDCCH), and the PDCCH is sent in the common search space in the downlink BWP; and sending the position information of the resource to the second communication node, and sending the notification information on the resource. The present application is designed for the control channel update notification message of the 5G MBS. When the first communication node receives the MBS session start/update/stop indication of the core network device, the first communication node needs to update the control channel (for example, MCCH) content. To indicate the update of the MCCH content, the first communication node configures the position of the resource of the MCCH update notification message (for example, the notification information in this embodiment of the present application) and notifies the second communication node of the position information of the configured resource. The first communication node sets the content of the notification information in the PDCCH and sends the notification information at the position of the configured resource. The second communication node interested in receiving the MBS service listens to the notification information at the position of the resource and reads the updated control channel content according to the detected content of the notification information. Using the preceding method in the 5G NR MBS service, the UE listens to the notification information according to the indication of the base station. When it is determined that the interested MCCH is updated, the UE needs to acquire the updated MCCH content, thereby effectively reducing power consumption of the UE and improving system performance.

The following lists some example embodiments for explaining the information notification method provided in FIG. 1 and FIG. 2 according to this embodiment of the present application. The following example embodiments may be executed singly or in combination.

Figure 5:
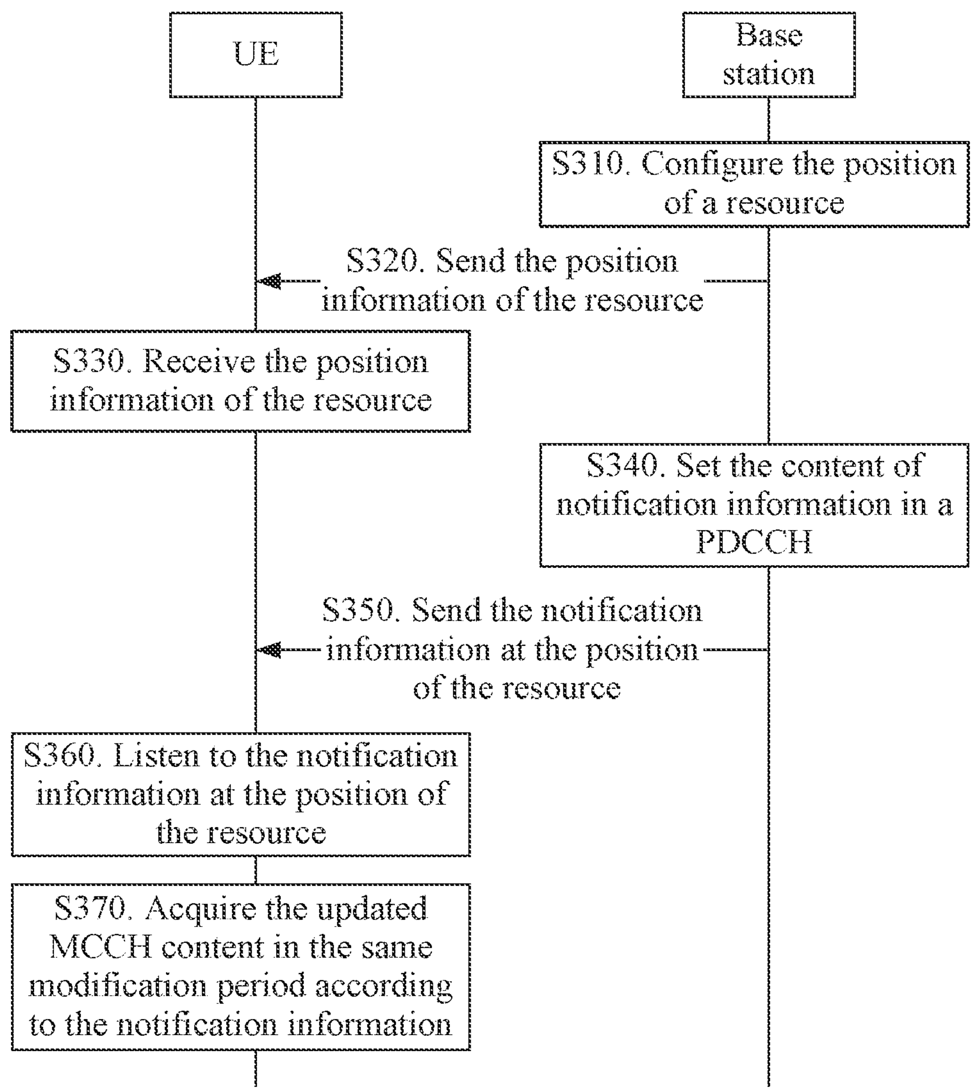
FIG. 5 is a flowchart illustrating the interaction in an information notification method according to an embodiment.

In a first example embodiment, FIG. 5 is a flowchart illustrating the interaction in an information notification method according to an embodiment. As shown in FIG. 5, this example embodiment is applicable to a scenario with only one MBS control channel. The method includes the following steps.

In S310, a base station configures the position of a resource.

The position of the resource includes the position of a time domain resource and the position of a frequency domain resource. Optionally, the position of the resource may also include the position of a beam resource.

In S320, the base station sends the position information of the resource to a UE.

The position information of the resource is indicated by using RRC signaling, such as SIB signaling in RMSI.

In S330, the UE receives the position information of the resource sent by the base station.

In S340, the base station sets the content of notification information in a PDCCH.

In S350, the base station sends the notification information to the UE at the position of the resource.

If the base station receives an MBS session start/update/stop message sent by a core network device, the base station sets the MSB or LSB of the DCI in the PDCCH configured to indicate the notification information or all valid bits to 1 to indicate that the MCCH is updated. Considering that there is only one MCCH, as long as a corresponding PDCCH is detected, it is indicated that the MCCH is updated. At this time, the value of the DCI bit may not be set, or the value of the bit in the DCI may be arbitrarily set. In this case, the UE does not need to detect the value of the DCI. At the same time, the base station scrambles the CRC of the PDCCH by using the RNTI specified in advance to indicate the notification information. That is, the modulo 2 sum operation is performed on the RNTI and the CRC, and the operation result is used as the final CRC. The base station sends the PDCCH (including the CRC) on the resource determined in the preceding steps.

In S360, the UE listens to the notification information sent by the base station at the position of the resource.

The UE listens to the PDCCH carrying the notification information at the corresponding position according to the received position information of the resource. The UE performs blind detection according to the PDCCH aggregation level (for example, the number of CCEs) at the position of the resource. If a PDCCH is detected, the CRC of the RNTI and PDCCH is used to perform a scrambling operation. If the result matches, it is indicated that the detected PDCCH is the PDCCH required by the UE. The UE reads the content of the DCI. Considering that there is only one MCCH, as long as the PDCCH scrambled by the preset notification information RNTI is received, it is indicated that the MCCH is updated. Therefore, the UE may not read the content of the DCI, that is, it is considered that the MCCH is updated.

In S370, the UE acquires the updated MCCH content in the same modification period according to the notification information.

The UE reads the content of the MCCH and acquires the updated part in the MCCH. The updated MCCH and the notification information are located in the same MCCH modification period.

Figure 6:
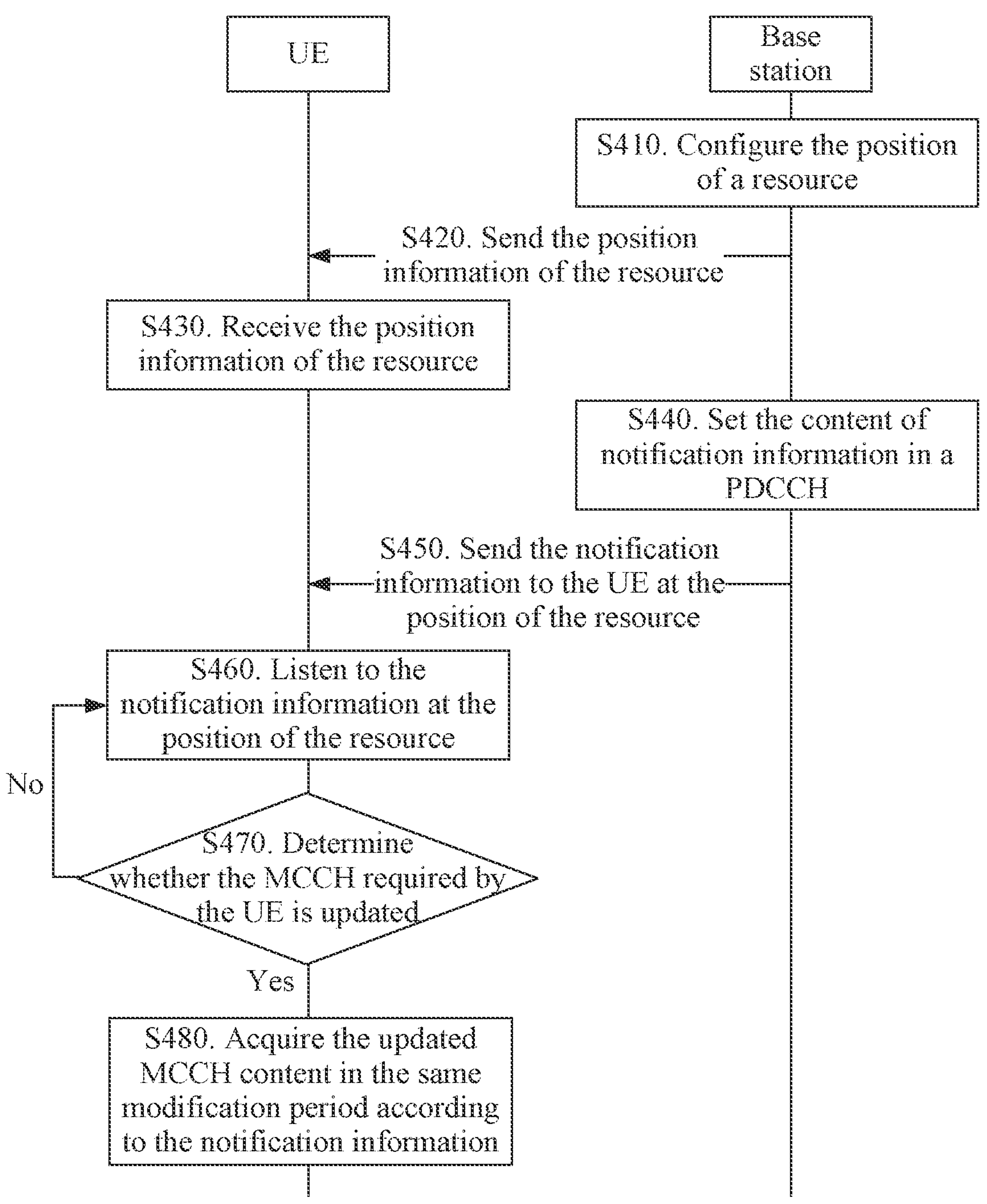
FIG. 6 is a flowchart illustrating the interaction in another information notification method according to an embodiment.

In a second example embodiment, FIG. 6 is a flowchart illustrating the interaction in another information notification method according to an embodiment. As shown in FIG. 6, this example embodiment is applicable to a scenario with multiple MBS control channels. The method includes the following steps.

In S410, a base station configures the position of a resource.

The position of the resource includes the position of a time domain resource and the position of a frequency domain resource. Optionally, the position of the resource may also include the position of a beam resource.

In S420, the base station sends the position information of the resource to a UE.

The position information of the resource is indicated by using RRC signaling, such as SIB signaling in RMSI.

In S430, the UE receives the position information of the resource sent by the base station.

In S440, the base station sets the content of notification information in a PDCCH.

In S450, the base station sends the notification information to the UE at the position of the resource.

Since multiple MCCHs exist, the base station acquires the specific MCCH in which update occurs according to the indication of a core network device. Assuming that a maximum of eight MCCHs (MCCH1 to MCCH8) can be configured in a cell, where MCCH1 and MCCH8 are updated, the notification information can be set according to the following two manners.

Manner 1: If the update of all MCCHs (1 to 8) corresponds to one preset RNTI, the base station sets the notification information as 00010001, that is, the content of the DCI is 00010001. The CRC of the PDCCH is scrambled by using the preset RNTI. The notification information is sent on the configured resource.

Manner 2: If the update of each MCCH corresponds to one preset RNTI (1 to 8), the base station sets two pieces of notification information respectively: One is 00010000 (the update of MCCH8), and another is 00000001 (the update of MCCH1). Then, the CRC of the PDCCH where MCCH1 updates the notification information is scrambled by RNTI-1. The CRC of the PDCCH where MCCH1 updates the notification information is scrambled by RNTI-5. Finally, the preceding two PDCCHs are sent on the configured resource. The resources of the two PDCCHs can be multiplexed in multiple manners, such as frequency-division multiplexing (FDM), time-division multiplexing (TDM), code-division multiplexing (CDM), or wavelength-division multiplexing (WDM).

In S460, the UE listens to the notification information sent by the base station at the position of the resource.

According to different designs of the PDCCH (one or more), the UE listens to the notification information at the position of the corresponding resource. For example, when there is only one PDCCH, all UEs interested in receiving the MBS service listen to the notification information on a common resource. If the update of each MCCH has a corresponding PDCCH, the UE listens to the corresponding PDCCH according to the MCCH in which the interested MB S service is located. If the UE cannot determine the MCCH in which the interested MBS service is located, the UE listens to the PDCCH corresponding to the update of all MCCHs.

In S470, the UE determines whether the MCCH required by the UE is updated.

The UE may determine whether the MCCH required by the UE is updated according to the content in the acquired DCI.

(1) If there is only one PDCCH, the UE determines that the required MCCH is updated. (2) If the update of each MCCH corresponds to one PDCCH, it can be determined that the MCCH is updated as long as the UE receives the corresponding PDCCH. (3) If the UE cannot determine the required MCCH, the UE needs to listen to all PDCCHs (one or more). Moreover, as long as the corresponding PDCCH is listened to, the UE needs to continue to read the updated MCCH content and determines whether the required MCCH is according to the updated MCCH content.

If the update of an MCCH is not required by the UE, the UE returns to execute the step S460.

In S480, if the update of an MCCH is required by the UE, the UE acquires the updated MCCH content in the same modification period according to the notification information.

The UE reads the content of the MCCH and acquires the updated part in the MCCH. The updated MCCH and the notification information are located in the same MCCH modification period.

Figure 7:
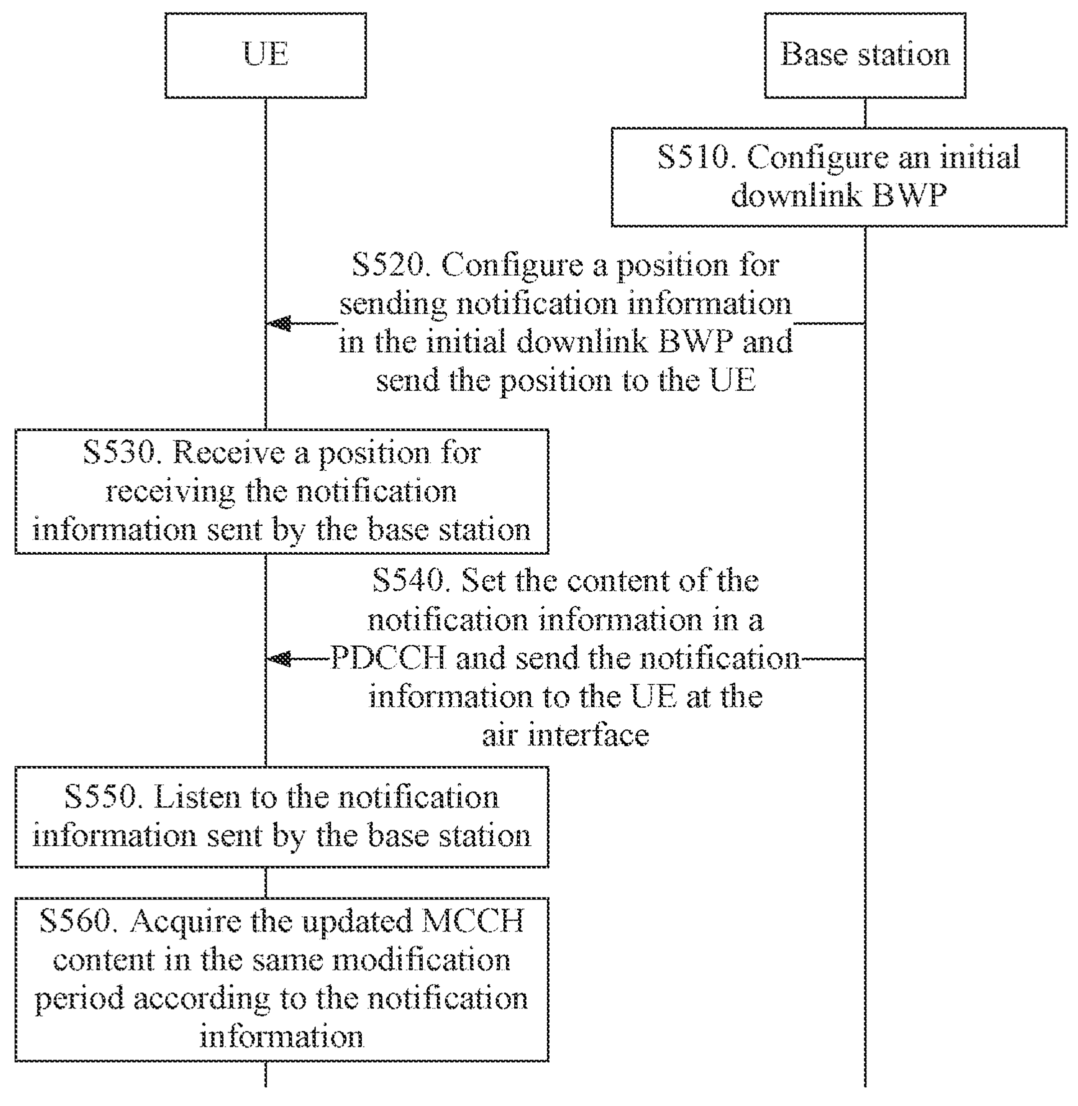
FIG. 7 is a flowchart illustrating the interaction in another information notification method according to an embodiment.

In a third example embodiment, FIG. 7 is a flowchart illustrating the interaction in another information notification method according to an embodiment. As shown in FIG. 7, this example embodiment is applicable to a scenario in which a frequency domain resource is located in an initial downlink BWP and the initial downlink BWP is equal to the bandwidth of CORESET #0. The method includes the following steps.

In S510, a base station configures an initial downlink BWP.

When a UE is turned on for initial access, an SSB and a PBCH are scanned first. Parameters of the CORESET #0 are determined according to the acquired SSB/PBCH. Basic configuration parameters of the initial downlink BWP are set to be the same as the parameters of the CORESET #0. The basic configuration parameters of the initial downlink BWP include bandwidth (for example, the number of PRBs), the position of frequency domain, and a parameter set (including a subcarrier spacing and a CP).

In S520, the base station configures a position for sending notification information in the initial downlink BWP and sends the position to the UE.

The position of the frequency domain in the initial downlink BWP is indicated by using RRC signaling.

The position CORESET of the frequency domain resource of the notification information is indicated by a bitmap. That is, the PRB occupied by the CORESET in the initial downlink BWP is indicated by using the RRC signaling in the frequency domain resource range of the notification information. Each bit indicates one RB group including six RBs. The bitmap may be used to arbitrarily select which RB groups in the initial downlink BWP to occupy.

In S530, the UE receives a position for receiving the notification information sent by the base station.

In S540, the base station sets the content of the notification information in a PDCCH and sends the notification information to the UE at the air interface.

In S550, the UE listens to the notification information sent by the base station.

In S560, the UE acquires the updated MCCH content in the same modification period according to the notification information.

Figure 8:
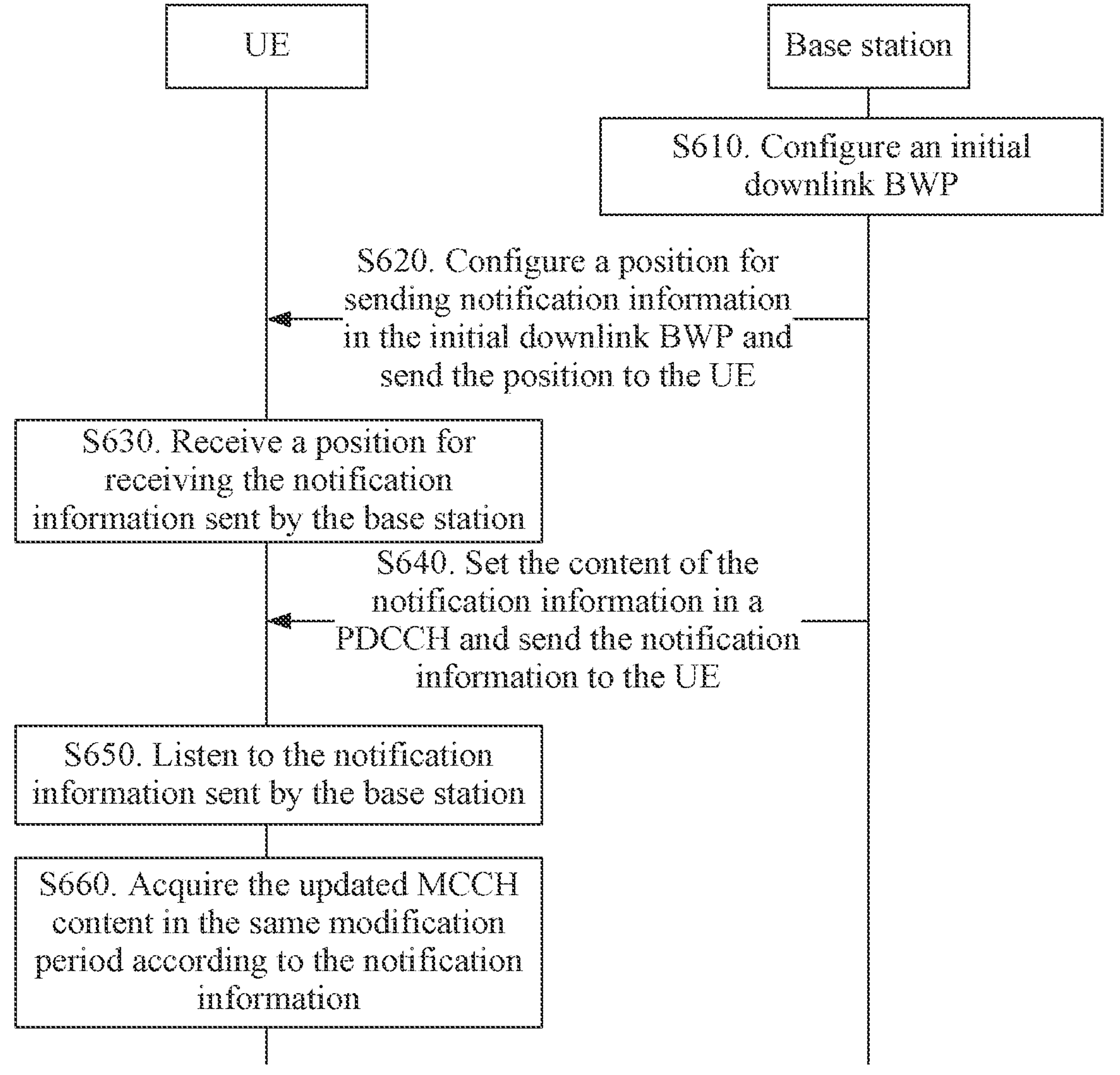
FIG. 8 is a flowchart illustrating the interaction in another information notification method according to an embodiment.

In a fourth example embodiment, FIG. 8 is a flowchart illustrating the interaction in another information notification method according to an embodiment. As shown in FIG. 8, this example embodiment is applicable to a scenario in which a frequency domain resource is located in an initial downlink BWP and the initial downlink BWP is configured by RMSI. The method includes the following steps.

In S610, a base station configures an initial downlink BWP.

An initially accessed UE determines the size and position of CORESET #0 according to the acquired SSB/PBCH. Then, the UE acquires the corresponding RMSI (such as SIB1, SIB2, . . . , etc.) content according to the CORESET #0. Finally, the basic configuration parameters of the initial downlink BWP, such as the offset of the initial downlink BWP relative to a CRB and the SSB and the RIV of the initial BWP, are indicated in the SIB or other available RRC signaling. The RIV indicates the starting point and length of the BWP.

In S620, the base station configures a position for sending notification information in the initial downlink BWP and sends the position to the UE.

The base station configures the position CORESET of the frequency domain of the notification information in the initial downlink BWP and indicates the position to the UE. The indication is sent by using RRC signaling. The CORESET resource may be a continuous frequency domain resource or a discontinuous frequency domain resource. The CORESET resource may be indicated by using a bitmap. That is, the PRB occupied by the CORESET in the initial downlink BWP is indicated by using the RRC signaling in the frequency domain resource range of the notification information. Each bit indicates one RB group includes six RBs. The bitmap may be used to arbitrarily select which RB groups in the downlink BWP to occupy.

In S630, the UE receives a position for receiving the notification information sent by the base station.

In S640, the base station sets the content of the notification information in a PDCCH and sends the notification information to the UE.

In S650, the UE listens to the notification information sent by the base station.

In S660, the UE acquires the updated MCCH content in the same modification period according to the notification information.

Figure 9:
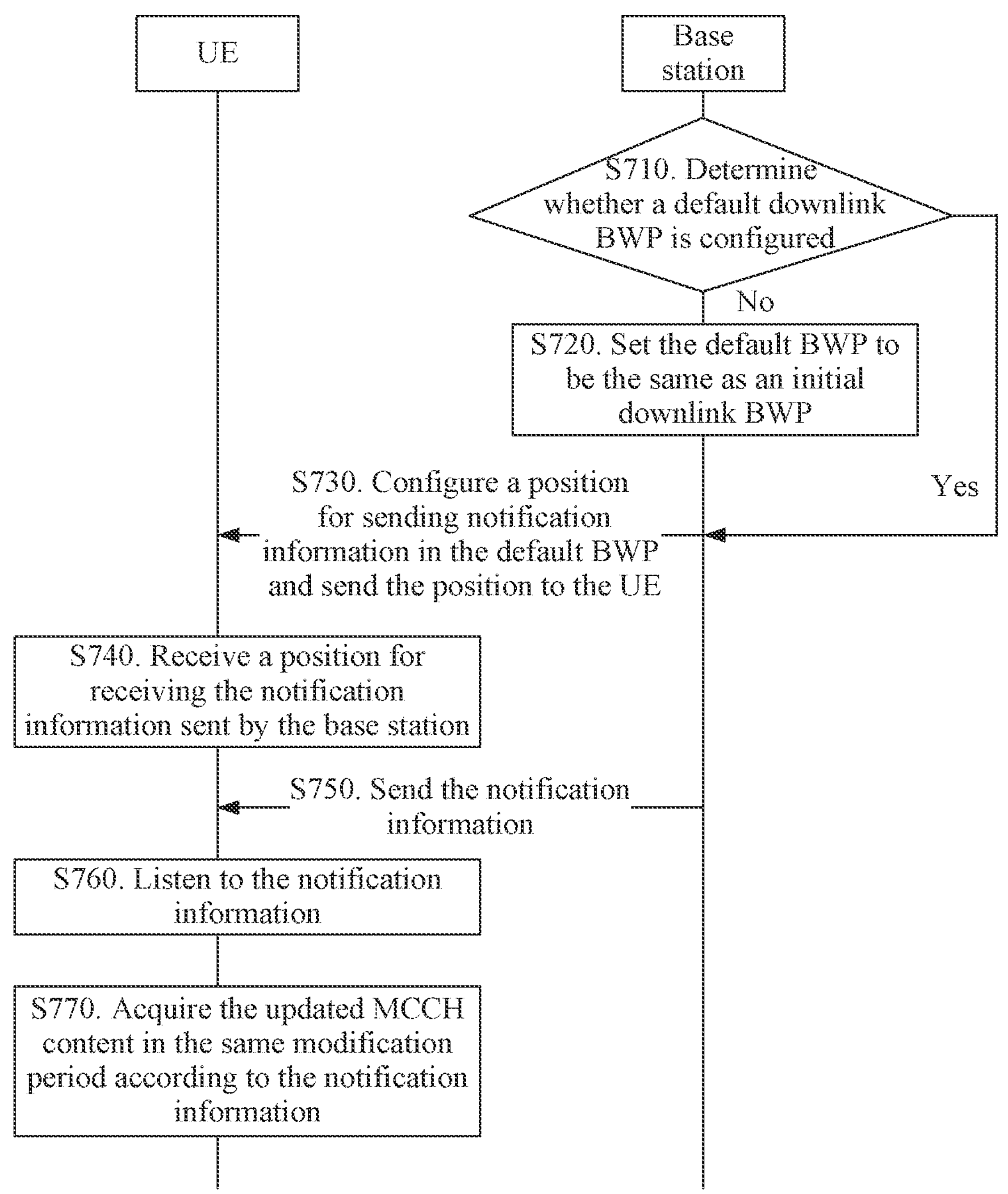
FIG. 9 is a flowchart illustrating the interaction in another information notification method according to an embodiment.

In a fifth example embodiment, FIG. 9 is a flowchart illustrating the interaction in another information notification method according to an embodiment. As shown in FIG. 9, this example embodiment is applicable to a scenario in which a frequency domain resource is located in a default downlink BWP. The method includes the following steps.

In S710, a base station determines whether a default downlink BWP is configured.

If the base station determines that a default downlink BWP is configured, the process continues with step S730. If the base station determines that a default downlink BWP is not configured, the process continues with step S720.

If the default downlink BWP is configured, the base station should indicate the position of the default BWP to a UE, such as indicate via RMSI.

In S720, the base station sets the default BWP to be the same as an initial downlink BWP.

If the default BWP is not configured, the initial downlink BWP is used as the default downlink BWP. The process continues with the step S730.

The initial downlink BWP may be set to CORESET #0 or may be configured according to the RMSI.

In S730, the base station configures a position for sending notification information in the default BWP and sends the position to the UE.

In S740, the UE receives a position for receiving the notification information sent by the base station.

In S750, the base station sends the notification information to the UE.

In S760, the UE listens to the notification information sent by the base station.

In S770, the UE acquires the updated MCCH content in the same modification period according to the notification information.

Figure 10:
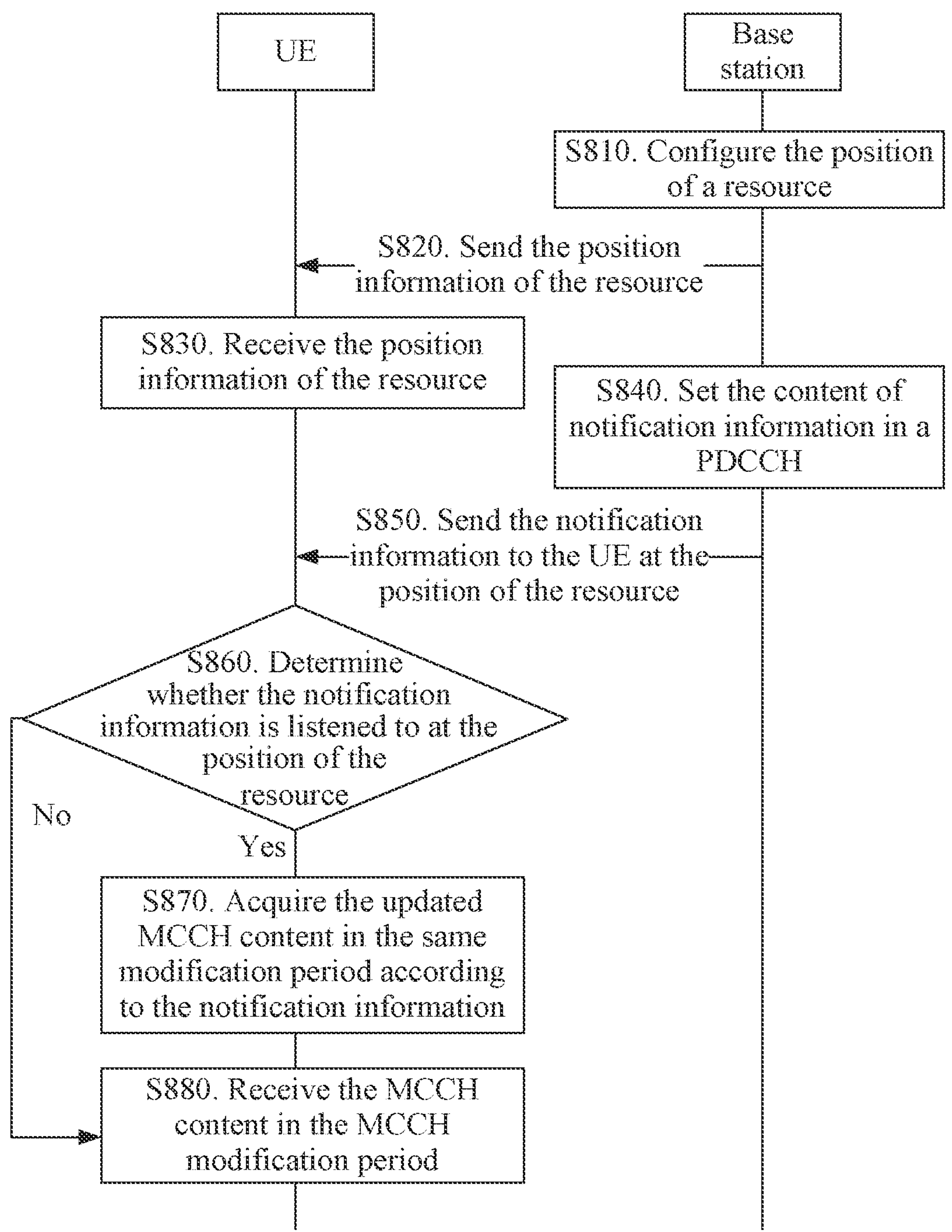
FIG. 10 is a flowchart illustrating the interaction in another information notification method according to an embodiment.

In a sixth example embodiment, FIG. 10 is a flowchart illustrating the interaction in another information notification method according to an embodiment. As shown in FIG. 10, this example embodiment is applicable to a scenario in which notification information is miss-detected. The method includes the following steps.

In S810, a base station configures the position of a resource.

In S820, the base station sends the position information of the resource to a UE.

In S830, the UE receives the position information of the resource sent by the base station.

In S840, the base station sets the content of notification information in a PDCCH.

In S850, the base station sends the notification information to the UE at the position of the resource.

In S860, the UE determines whether the notification information is listened to at the position of the resource.

If the notification information is listened to, the process continues with step S870. If the notification information is not listened to, the process continues with step S880.

In S870, the UE acquires the updated MCCH content in the same modification period according to the notification information.

In S880, the UE receives the MCCH content in the MCCH modification period.

If the UE does not listen to the notification information during an MCCH modification period, for example, the UE does not detect the PDCCH, or the detected PDCCH does not have the MCCH updated notification information, the UE reads the MCCH content at least once in the MCCH modification period to improve the reliability of the detection to the notification information.

Figure 11:
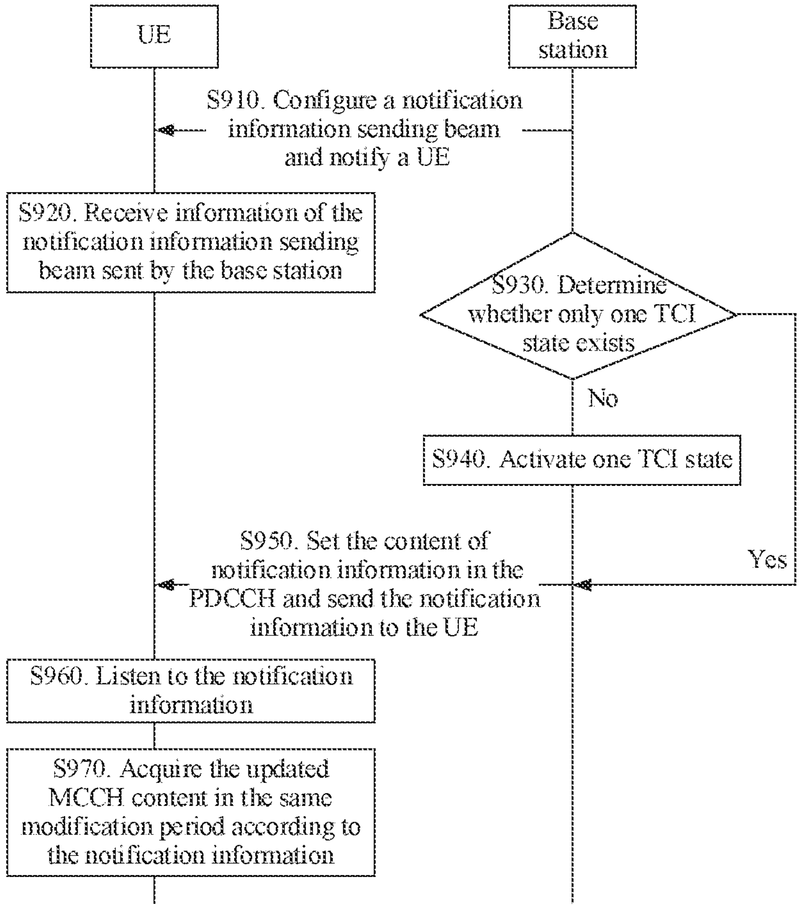
FIG. 11 is a flowchart illustrating the interaction in another information notification method according to an embodiment.

In a seventh example embodiment, FIG. 11 is a flowchart illustrating the interaction in another information notification method according to an embodiment. As shown in FIG. 11, this example embodiment is applicable to a scenario in which a notification information sending beam is configured. The method includes the following steps.

In S910, a base station configures a notification information sending beam and notifies a UE.

This can be implemented by using the transmission TCI state and the QCL information. For example, the base station configures one or more TCI states through RRC signaling. For high frequency bands, such as FR2 (Frequency Range 2, 24.25 GHz to 52.6 GHz), the UE may use beamforming. That is, the beam receiving the notification information may also be indicated by using the TCI state.

In S920, the UE receives information of the notification information sending beam sent by the base station.

In S930, the base station determines whether only one TCI state exists.

If the base station determines that only one TCI state exists, the process continues with step S950. If the base station determines that not only one TCI state exists, the process continues with step S940.

In S940, the base station activates one TCI state.

If there are multiple TCIs, the base station activates one of TCI states through MAC CE signaling to indicate reception of the PDCCH. The process continues with step S950.

In S950, the base station sets the content of notification information in the PDCCH and sends the notification information to the UE.

If there is only one TCI, the TCI is used for indicating the reception of the PDCCH. The base station sends the PDCCH on the beam indicated by the TCI.

In S960, the UE listens to the notification information sent by the base station.

In S970, the UE acquires the updated MCCH content in the same modification period according to the notification information.

Figure 12:
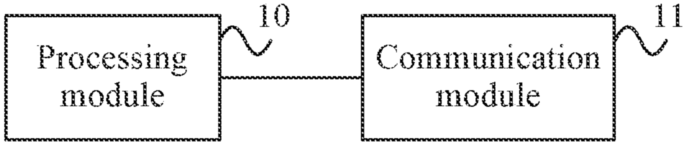
FIG. 12 is a diagram illustrating the structure of an information notification apparatus according to an embodiment.

FIG. 12 is a diagram illustrating the structure of an information notification apparatus according to an embodiment. The apparatus may be configured in a base station. As shown in FIG. 12, the apparatus includes a processing module 10 and a communication module 11.

The processing module 10 is configured to determine the position of a resource. The resource is configured to send notification information. The resource includes at least a time domain resource and a frequency domain resource. The frequency domain resource is located in a downlink BWP. The notification information is configured to indicate, by using downlink control information (DCI) of a physical downlink control channel (PDCCH), that multicast control channel (MCCH) information is updated. The PDCCH is sent in a common search space in the downlink BWP. The communication module 11 is configured to send position information of the resource to a second communication node and send the notification information on the resource.

The information notification apparatus provided in this embodiment is configured to perform the information notification method in the embodiment shown in FIG. 3. The information notification apparatus provided in this embodiment has similar implementation principles and technical effects with the preceding embodiments. Details are not described here again.

In an embodiment, the notification information and the updated MCCH information indicated by the notification information are located in the same modification period. The cyclic redundancy check (CRC) of the PDCCH is scrambled by using a radio network temporary identity (RNTI) dedicated to the notification information.

In an embodiment, the second communication node interested in receiving the multicast broadcast service (MBS) service reads the MCCH information at least once in each modification period.

In an embodiment, the resource also includes a beam resource. The position of the resource also includes the position of the beam resource.

In an embodiment, the frequency domain resource is located in the downlink BWP, including any one of the following: the frequency domain resource is located in the initial downlink BWP; the frequency domain resource is located in a specific downlink BWP of the second communication node; or the frequency domain resource is located in a default downlink BWP.

In an embodiment, the initial downlink BWP is equal to the bandwidth of a control resource set CORESET #0. Alternatively, the initial downlink BWP is configured by radio resource control (RRC) signaling.

In an embodiment, the position information of the frequency domain resource is indicated by using a bitmap in RRC signaling. The bitmap indicates the physical resource block (PRB) occupied by the notification information in the downlink BWP.

In an embodiment, the time domain resource includes a slot period, a slot offset, a slot number, a symbol offset, and a symbol number. The symbol offset is indicated by using a bitmap.

In an embodiment, the position information of the resource is indicated by using RRC signaling.

In an embodiment, the position information of the beam resource is indicated by using a transmission configuration indication (TCI) state and quasi co-location (QCL) information in RRC signaling. If the RRC signaling includes at least two TCI states, the position information of the beam resource is indicated by using one of the TCI states activated by a media access control control element (MAC CE). The reference signal corresponding to the QCL information is used for receiving the PDCCH in which the notification information is located.

Figure 13:
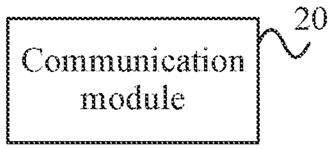
FIG. 13 is a diagram illustrating the structure of another information notification apparatus according to an embodiment.

FIG. 13 is a diagram illustrating the structure of another information notification apparatus according to an embodiment. The apparatus may be configured in a UE. As shown in FIG. 13, the apparatus includes a communication module 20.

The communication module 20 is configured to receive position information of a resource sent by a first communication node. The resource is configured to send notification information. The resource includes at least a time domain resource and a frequency domain resource. The frequency domain resource is located in a downlink BWP. The notification information is configured to indicate, by using downlink control information (DCI) of a physical downlink control channel (PDCCH), that multicast control channel (MCCH) information is updated. The PDCCH is sent in a common search space in the downlink BWP.

The information notification apparatus provided in this embodiment is configured to perform the information notification method in the embodiment shown in FIG. 4. The information notification apparatus provided in this embodiment has similar implementation principles and technical effects with the preceding embodiments. Details are not described here again.

Figure 14:
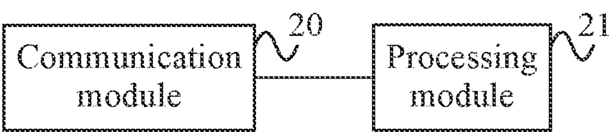
FIG. 14 is a diagram illustrating the structure of another information notification apparatus according to an embodiment.

In an embodiment, on the basis of the preceding embodiment, FIG. 14 is a diagram illustrating the structure of another information notification apparatus according to an embodiment. The apparatus also includes a processing module 21. The processing module 21 is configured to listen to the notification information sent by the first communication node at the position of the resource, where the listening is performed by using the RNTI dedicated to the notification information in the common search space in the downlink BWP; and acquires the updated MCCH content in the same modification period according to the notification information.

In an embodiment, the second communication node interested in receiving the multicast broadcast service (MBS) service reads the MCCH information at least once in each modification period.

In an embodiment, the resource also includes a beam resource. The position of the resource also includes the position of the beam resource.

In an embodiment, the frequency domain resource is located in the downlink BWP, including any one of the following: the frequency domain resource is located in the initial downlink BWP; the frequency domain resource is located in a specific downlink BWP of the second communication node; or the frequency domain resource is located in a default downlink BWP.

In an embodiment, the initial downlink BWP is equal to the bandwidth of a control resource set CORESET #0. Alternatively, the initial downlink BWP is configured by radio resource control (RRC) signaling.

In an embodiment, the position information of the frequency domain resource is indicated by using a bitmap in RRC signaling. The bitmap indicates the physical resource block (PRB) occupied by the notification information in the downlink BWP.

In an embodiment, the time domain resource includes a slot period, a slot offset, a slot number, a symbol offset, and a symbol number. The symbol offset is indicated by using a bitmap.

In an embodiment, the position information of the resource is indicated by using RRC signaling.

In an embodiment, the position information of the beam resource is indicated by using a transmission configuration indication (TCI) state and quasi co-location (QCL) information in RRC signaling. If the RRC signaling includes at least two TCI states, the position information of the beam resource is indicated by using one of the TCI states activated by a media access control control element (MAC CE). The reference signal corresponding to the QCL information is used for receiving the PDCCH in which the notification information is located.

An embodiment of the present application also provides a communication node. The communication node includes a processor. The processor is configured to, when executing a computer program, implement the method provided in any embodiment of the present application. The device may be the first communication node (for example, a base station) provided in any embodiment of the present application or may be the second communication node (for example, a UE) provided in any embodiment of the present application. This is not limited in the present application.

Exemplarily, the following embodiments provide structural diagrams of a base station and a UE as communication nodes.

Figure 15:
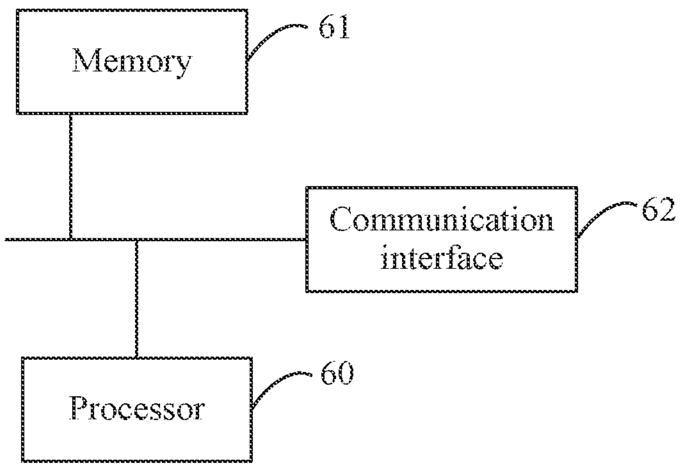
FIG. 15 is a diagram illustrating the structure of a base station according to an embodiment.

FIG. 15 is a diagram illustrating the structure of a base station according to an embodiment. As shown in FIG. 15, the base station includes a processor 60, a memory 61, and a communication interface 62. One or more processors 60 may be provided in the base station, and one processor 60 is used as an example in FIG. 15. The processor 60, the memory 61, and the communication interface 62 that are in the base station may be connected through a bus or in other manners. In FIG. 15, the connection through a bus is used as an example. The bus represents one or more of several types of bus structures, including a memory bus or a memory controller, a peripheral bus, an Accelerated Graphics Port (AGP), a processor, or a local bus using any bus structure among multiple bus structures.

As a computer-readable storage medium, the memory 61 may be configured to store software programs, computer-executable programs and modules, such as program instructions/modules corresponding to the method in the embodiments of the present application. The processor 60 runs the software programs, instructions, and modules stored in the memory 61 to execute at least one of function applications and data processing of the base station, that is, to implement the information notification method described above.

The memory 61 may include a program storage region and a data storage region. The program storage region may store an operating system and an application program required by at least one function. The data storage region may store data created depending on use of a terminal. Additionally, the memory 61 may include a high-speed random-access memory and may also include a nonvolatile memory such as at least one disk memory, a flash memory, or another nonvolatile solid-state memory. In some examples, the memory 61 may include memories which are remotely disposed relative to the processor 60. These remote memories may be connected to the base station via a network. Examples of the preceding network include, but are not limited to, the Internet, an intranet, a network, a communication network, and a combination thereof.

The communication interface 62 may be configured to receive and send data.

Figure 16:
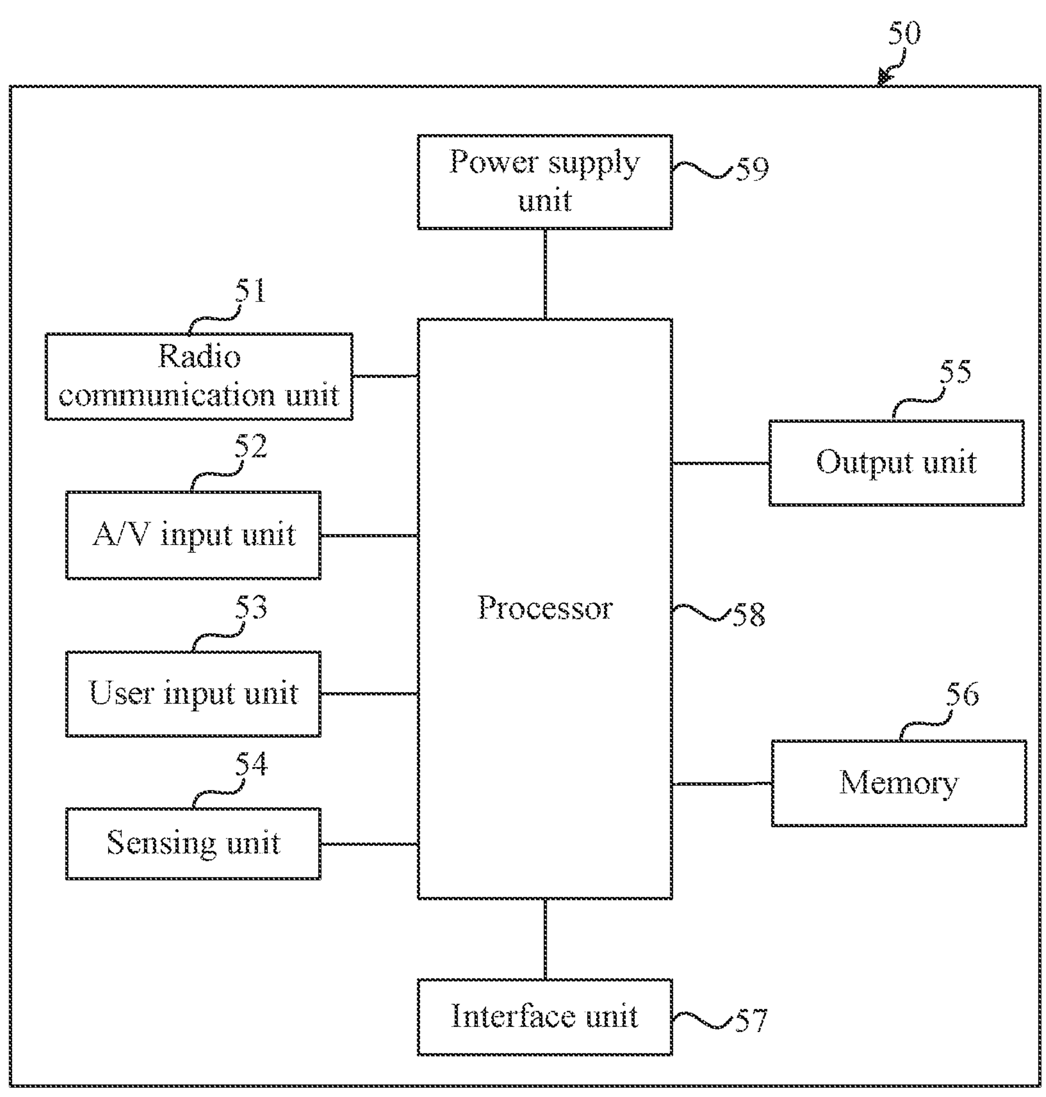
FIG. 16 is a diagram illustrating the structure of a UE according to an embodiment.

FIG. 16 is a diagram illustrating the structure of a UE according to an embodiment. The UE may be implemented in multiple forms. The UE in the present application includes, but is not limited to, a mobile terminal device and a fixed terminal device. The mobile terminal device may be, for example, a mobile phone, a smartphone, a notebook computer, a digital broadcast receiver, a personal digital assistant (PDA), a portable device (PAD), a portable media player (PMP), a navigation apparatus, a vehicle-mounted terminal device, a vehicle-mounted display terminal, and a vehicle-mounted electronic rearview mirror. The fixed terminal device may be, for example, a digital television (TV) and a desktop computer.

As shown in FIG. 16, the UE 50 may include a radio communication unit 51, an audio/video (A/V) input unit 52, a user input unit 53, a sensing unit 54, an output unit 55, a memory 56, an interface unit 57, a processor 58, a power supply unit 59, and the like. FIG. 16 illustrates the UE including multiple components; but it is to be understood that not all illustrated components are required to be implemented. More or fewer components may be implemented instead.

In this embodiment, the radio communication unit 51 allows radio communication between the UE 50 and a base station or a network. The A/V input unit 52 is configured to receive audio or video signals. The user input unit 53 may generate key input data according to commands input by a user to control various operations of the UE 50. The sensing unit 54 detects the current state of the UE 50, the position of the UE 50, the presence or absence of the user's touch input to the UE 50, the orientation of the UE 50, the acceleration or deceleration movement and direction of the UE 50 and so on, and generates commands or signals for controlling the operation of the UE 50. The interface unit 57 serves as an interface through which at least one external apparatus can be connected to the UE 50. The output unit 55 is configured to provide output signals in a visual, audio, and/or tactile manner. The memory 56 may store software programs for processing and controlling operations executed by the processor 58 or may temporarily store data that has been output or will be output. The memory 56 may include at least one type of storage medium. Moreover, the UE 50 may cooperate with a network storage device that performs the storage function of the memory 56 through network connection. The processor 58 is generally configured to control an overall operation of the UE 50. The power supply unit 59 receives external power or internal power under the control of the processor 58 and provides appropriate power required to operate various members and components.

The processor 58 runs the programs stored in the memory 56 to perform at least one function application and data processing, for example, to implement the method provided in the embodiments of the present application.

An embodiment of the present application also provides a computer-readable storage medium. The computer-readable storage medium is configured to store a computer program which, when executed by a processor, implements the method provided in any embodiment of the present application.

A computer storage medium in this embodiment of the present application may use any combination of one or more computer-readable media. A computer-readable medium may be a computer-readable signal medium or a computer-readable storage medium. The computer-readable storage medium may be, for example, but is not limited to, an electrical, magnetic, optical, electromagnetic, infrared or semiconductor system, apparatus or device, or any combination thereof. The computer-readable storage medium includes (a non-exhaustive list): an electrical connection having one or more wires, a portable computer disk, a hard disk, a random access memory (RAM), a read-only memory (ROM), an electrically erasable programmable read-only memory (EPROM), a flash memory, an optical fiber, a portable compact disk read-only memory (CD-ROM), an optical memory component, a magnetic memory component, or any suitable combination thereof. In the present application, the computer-readable storage medium may be any tangible medium including or storing a program. The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than a computer-readable storage medium. The computer-readable medium may send, propagate, or transmit the program used by or used in conjunction with the instruction execution system, apparatus, or device.

Program codes included on the computer-readable medium may be transmitted by using any suitable medium including, but not limited to, a radio medium, a wire, an optical cable, radio frequency (RF) and the like, or any suitable combination thereof.

Computer program codes for executing the operations of the present disclosure may be written in one or more programming languages or a combination of multiple programming languages. The programming languages include object-oriented programming languages such as Java, Smalltalk, C++, Ruby and Go, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

It is to be understood by those skilled in the art that the term "user terminal" covers any suitable type of radio UE, for example, a mobile phone, a portable data processing apparatus, a portable web browser, or a vehicle-mounted mobile station.

In general, multiple embodiments of the present application may be implemented in hardware, dedicated circuits, software, logics, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in the memory. The memory may be of any type appropriate for the local technical environment and may be implemented by using any appropriate data storage technology, such as, but not limited to, a read-only memory (ROM), a random access memory (RAM), an optical storage apparatus and system (a digital versatile disc (DVD) or a compact disk (CD)), and the like. The computer-readable medium may include a non-transitory storage medium. The data processor may be of any type suitable to the local technical environment, such as, but not limited to, a general purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. An information notification method, the method being applied to a first communication node and comprising:

determining a position of a resource, wherein the resource is configured to send notification information which is configured to indicate that multicast control channel (MCCH) information is updated, the resource comprises at least a time domain resource and a frequency domain resource, the frequency domain resource is located in a downlink bandwidth part (BWP), the notification information is indicated by using a bitmap in downlink control information (DCI) of a physical downlink control channel (PDCCH), the bitmap indicates a MCCH which is updated, and the PDCCH is sent in a common search space in the downlink BWP; and sending position information of the resource to a second communication node, and sending the notification information on the resource;

wherein the resource further comprises a beam resource, and the position of the resource further comprises a position of the beam resource;

wherein position information of the beam resource is indicated by using a transmission configuration indication (TCI) state and quasi co-location (QCL) information in RRC signaling, in a case where the RRC signaling comprises at least two TCI states, the position information of the beam resource is indicated by using one of the at least two TCI states activated by a media access control control element (MAC CE), and a reference signal corresponding to the QCL information is configured to receive the PDCCH in which the notification information is located.

2. The method according to claim 1, wherein the notification information and the updated MCCH information indicated by the notification information are located in a same modification period, and a cyclic redundancy check (CRC) of the PDCCH is scrambled by using a radio network temporary identity (RNTI) dedicated to the notification information.

3. The method according to claim 1, wherein the second communication node interested in receiving a multicast broadcast service (MBS) service reads the MCCH information at least once in each modification period.

4. The method according to claim 1, wherein the frequency domain resource being located in the downlink BWP comprises one of the following:

the frequency domain resource being located in an initial downlink BWP;

the frequency domain resource being located in a specific downlink BWP of the second communication node; or the frequency domain resource being located in a default downlink BWP;

the initial downlink BWP is equal to bandwidth of a control resource set CORESET #0; or, the initial downlink BWP is configured by radio resource control (RRC) signaling.

5. The method according to claim 1, wherein position information of the frequency domain resource is indicated by using a bitmap in RRC signaling, and the bitmap in the RRC signaling indicates a physical resource block (PRB) occupied by the notification information in the downlink BWP.

6. The method according to claim 1, wherein the time domain resource comprises a slot period, a slot offset, a slot number, a symbol offset, and a symbol number, wherein the symbol offset is indicated by using a bitmap.

7. The method according to claim 1, wherein the position information of the resource is indicated by using RRC signaling.

8. An information notification method, the method being applied to a second communication node and comprising:

receiving position information of a resource sent by a first communication node, wherein the resource is configured to send notification information which is configured to indicate that multicast control channel (MCCH) information is updated, the resource comprises at least a time domain resource and a frequency domain resource, the frequency domain resource is located in a downlink bandwidth part (BWP), the notification information is indicated by using a bitmap in downlink control information (DCI) of a physical downlink control channel (PDCCH), the bitmap indicates a MCCH which is updated, and the PDCCH is sent in a common search space in the downlink BWP;

wherein the resource further comprises a beam resource, and a position of the resource further comprises a position of the beam resource;

wherein position information of the beam resource is indicated by using a transmission configuration indication (TCI) state and quasi co-location (QCL) information in RRC signaling, in a case where the RRC signaling comprises at least two TCI states, the position information of the beam resource is indicated by using one of the at least two TCI states activated by a media access control control element (MAC CE), and a reference signal corresponding to the QCL information is configured to receive the PDCCH in which the notification information is located.

9. The method according to claim 8, further comprising:

listening to the notification information sent by the first communication node at a position of the resource, wherein the listening is performed by using a radio network temporary identity (RNTI) dedicated to the notification information in the common search space in the downlink BWP; and acquiring updated MCCH content in a same modification period according to the notification information.

10. The method according to claim 8, wherein the second communication node interested in receiving a multicast broadcast service (MBS) service reads the MCCH information at least once in each modification period.

11. The method according to claim 8, wherein the frequency domain resource being located in the downlink BWP, comprising one of the following:

the frequency domain resource being located in an initial downlink BWP;

the frequency domain resource being located in a specific downlink BWP of the second communication node; or the frequency domain resource being located in a default downlink BWP;

the initial downlink BWP is equal to bandwidth of a control resource set CORESET #0; or, the initial downlink BWP is configured by radio resource control (RRC) signaling.

12. The method according to claim 8, wherein position information of the frequency domain resource is indicated by using a bitmap in RRC signaling, and the bitmap in the RRC signaling indicates a physical resource block (PRB) occupied by the notification information in the downlink BWP.

13. The method according to claim 8, wherein the time domain resource comprises a slot period, a slot offset, a slot number, a symbol offset, and a symbol number, wherein the symbol offset is indicated by using a bitmap.

14. The method according to claim 8, wherein the position information of the resource is indicated by using RRC signaling.

15. A communication node, comprising a processor, wherein the processor is configured, when executing a computer program, to implement a information notification method, wherein the information notification method comprises:

determining a position of a resource, wherein the resource is configured to send notification information which is configured to indicate that multicast control channel (MCCH) information is updated, the resource comprises at least a time domain resource and a frequency domain resource, the frequency domain resource is located in a downlink bandwidth part (BWP), the notification information is indicated by using a bitmap in downlink control information (DCI) of a physical downlink control channel (PDCCH), the bitmap indicates a MCCH which is updated, and the PDCCH is sent in a common search space in the downlink BWP; and sending position information of the resource to a second communication node, and sending the notification information on the resource;

wherein the resource further comprises a beam resource, and the position of the resource further comprises a position of the beam resource;

wherein position information of the beam resource is indicated by using a transmission configuration indication (TCI) state and quasi co-location (QCL) information in RRC signaling, in a case where the RRC signaling comprises at least two TCI states, the position information of the beam resource is indicated by using one of the at least two TCI states activated by a media access control control element (MAC CE), and a reference signal corresponding to the QCL information is configured to receive the PDCCH in which the notification information is located.

16. A non-transitory computer-readable storage medium storing a computer program which, when executed by a processor, implements the information notification method according to claim 1.

* * * * *